May 21, 1946.    C. WILLIAMS    2,400,674
FUMIGATOR
Filed Nov. 23, 1944

INVENTOR.
CHARLES WILLIAMS
BY
ATTORNEY

Patented May 21, 1946

2,400,674

UNITED STATES PATENT OFFICE 2,400,674

FUMIGATOR

Charles Williams, Antioch, Nebr.

Application November 23, 1944, Serial No. 564,746

3 Claims. (Cl. 6—1)

This invention relates to fumigating devices for charging the super hive compartments or sections of bee hives wherein the honey is stored, with the fumes of a carbolic acid solution, or other suitable solution, for the purpose of driving the bees from this section preliminary to the removal of the honey.

The primary object of the invention is to provide a frame which may be interposed between the cover of the hive and the honey containing super section thereof, the said frame carrying therein a plurality of troughs supported in parallel spaced relation and covered by a plurality of arcuate covers in the form of inverted troughs arranged and supported in overlapping relation above the lower troughs, and a fabric pad mounted over the trough assembly for receiving and holding a sprayed solution of carbolic acid and water, or other suitable solution, and there being openings provided at the sides of the lower troughs through which the acid fumes from the said solution may descend into the super honey section for the stated purpose of driving the bees therefrom.

Another object of the invention is to provide for a bee-hive which includes a base section or brood section and a super section or honey section and a cover positioned atop the honey section, a fume dispensing device for mounting atop the honey or super section and below the cover, the said fume dispensing device including means for receiving and carrying a carbolic acid solution or other suitable solution for the purpose, and whereby the fumes from the solution may descend into the super or honey section for the purpose of driving the bees therefrom.

With the stated objects in view, together with such other and additional objects and advantages as may appear from the specification, a preferred embodiment of the invention is shown in the accompanying drawing, and wherein.

Figure 1:
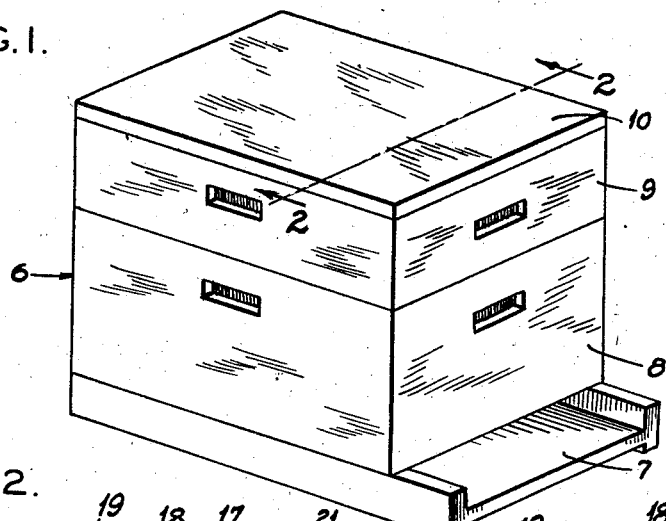
Figure 1 is a perspective view of a bee hive of conventional structure and including a bottom or base plate, a base section or brood section and a super or honey section.
Figure 2:
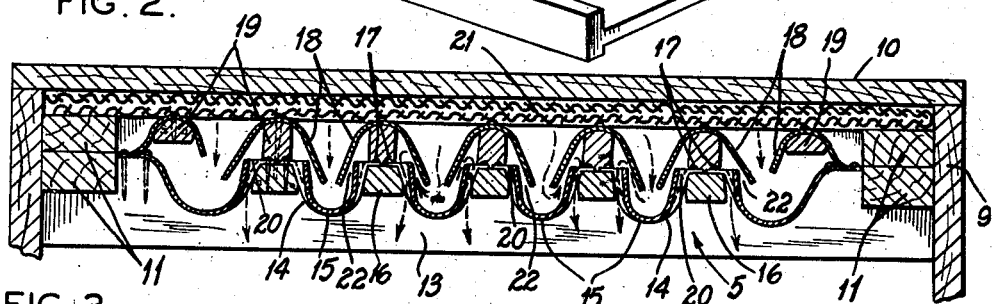
Figure 2 is a cross section on the line 2—2 of Figure 1.
Figure 3:
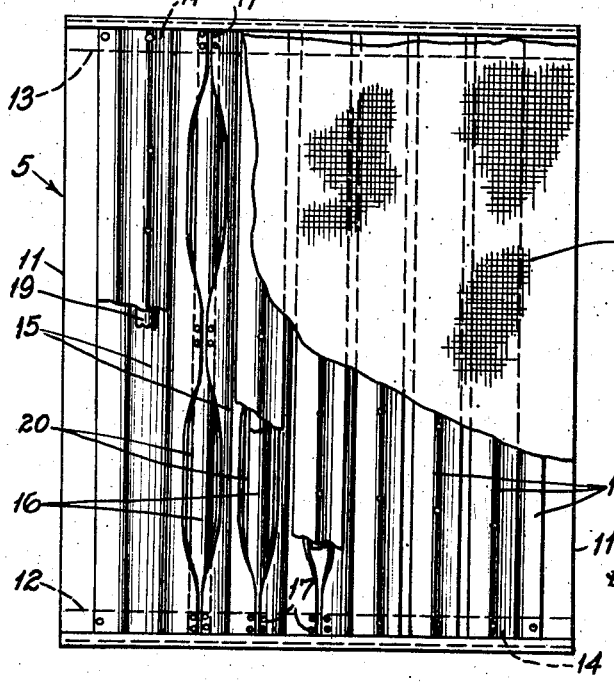
Figure 3 is a plan view of the device itself comprising the subject matter of this invention, and as removed from the bee-hive.

The invention comprises a rectangular frame 5 dimensioned and adapted for mounting atop the lower or brood section of a bee-hive 6, which includes the base plate 7, the brood section 8, the super or honey section 9, and the cover 10.

The frame 5 is adapted to be inclosed below the cover 10 as supported atop the honey section 9, and the frame includes the side strips 11, and the frontal and back connecting members 12 and 13, all of course rigidly connected at the corners in any conventional manner. The frontal connecting member 12, and also the back or rear connecting member 13 are formed with arcuately depressed ledges or seats 14. Longitudinally extended and laterally spaced sheet metal troughs 15 are seated at their ends within the seats 14 of the frontal and rear connecting members 12 and 13, these ends being secured in place in any conventional manner. The troughs 15 are supported in their regular spaced relation by means of the interposed spacing strips 16 to which the upraised margins of the troughs are attached as at 17. Arcuate covers 18, of metal or other suitable material are positioned in overlapping relation above the troughs 15, and are supported in place by means of the strips 19 mounted medially atop the spacing strips 16 and properly secured thereto. At longitudinally spaced intervals the upper margins of the troughs 15 are spread from the supporting spacing strips 16 in order to provide the laterally disposed louvers 20 through which fumes may pass and descend into the super 9 for the purpose of driving the bees therefrom. A pad 21 of fabric or other suitable material is spread and extended over the upper side of the device, the said pad being adapted to receive and hold any desired solution such as a solution of carbolic acid or otherwise, the fumes of which are calculated and designed to drive bees from the super or honey section of the hive so as to clear same for the removal of the honey therefrom.

It is to be noted that the pendant skirts of the arcuate covers 18 are spaced from the adjacent upper margins of the troughs 15, so as to provide openings or passages 22 between these elements through which may flow the fumes from the pad 21 as saturated with the stated solution.

In the use of the invention as described, and with the fumigating device as described properly mounted in place at the top of the bee-hive in the manner described, the absorbent pad 21 is saturated with the acid solution, such as the carbolic acid or other solution selected, and the cover 10 then replaced on top of the hive assembly. The acid fumes as generated from the acid solution will then descend through the louvers 20 into the super section 9 and will influence and force the bees therein to leave that section and descend into the brood section 8, thus clearing the super or honey section for the removal of honey therefrom.

While I have here shown and described a specific embodiment of the invention, and have detailed and shown certain structural features thereof, the described embodiment and structural features may be changed or modified as may be desired, within the scope however of the appended claims.

I claim:

1. In a device of the kind described for mounting upon the honey section of a bee-hive, a supporting frame, trough supporting strips extended across the frame in spaced relation, troughs extended between the said supporting strips and attached thereto at their up-turned margins, said margins however being spread from the strips at spaced points for providing louvers opening downwardly into the honey section, and through which louvers chemical fumes may descend into the honey section from any solution held in the troughs.

2. In a device of the kind described for mounting upon the honey section of a bee-hive, a supporting frame, a plurality of trough supporting strips extended across the frame in spaced relation, troughs extended between the said strips and marginally attached thereto at spaced points, the intermediate marginal portions of the troughs being spread from the strips to form open louvers for passing chemical fumes into the honey section, and covers arcuate in cross section mounted over the troughs with their down-turned margins over-lapping in spaced relation the upturned margins of the troughs.

3. In a device according to claim 2, an absorbent pad extended over the upper side of the device.

CHARLES WILLIAMS.